(12) United States Patent
Eun et al.

(10) Patent No.: US 11,465,292 B2
(45) Date of Patent: Oct. 11, 2022

(54) MODULAR MOVABLE ROBOT

(71) Applicant: LG ELECTRONICS INC., Seoul (KR)

(72) Inventors: Yousook Eun, Seoul (KR); Jinsu Kim, Seoul (KR); Taewoo Yoo, Seoul (KR); Soonho Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 16/641,087

(22) PCT Filed: May 20, 2019

(86) PCT No.: PCT/KR2019/005984
§ 371 (c)(1),
(2) Date: Feb. 21, 2020

(87) PCT Pub. No.: WO2019/240389
PCT Pub. Date: Dec. 19, 2019

(65) Prior Publication Data
US 2020/0254623 A1      Aug. 13, 2020

(30) Foreign Application Priority Data
Jun. 14, 2018 (KR) .................. 10-2018-0068252

(51) Int. Cl.
*B60S 9/00* (2006.01)
*B25J 11/00* (2006.01)
(Continued)

(52) U.S. Cl.
CPC ............. *B25J 11/008* (2013.01); *B25J 5/007* (2013.01); *B25J 9/08* (2013.01); *G05D 1/0238* (2013.01);
(Continued)

(58) Field of Classification Search
CPC .. B25J 11/008; B25J 5/007; B25J 9/08; G06F 21/35
(Continued)

(56) References Cited

U.S. PATENT DOCUMENTS 10,482,550 B1 *  11/2019  Theobald ............... B25J 11/008
2007/0192910 A1    8/2007  Vu et al.
(Continued)

FOREIGN PATENT DOCUMENTS

EP             3135441 A1    3/2017
KR   10-2011-0004015 A       1/2011
(Continued)

*Primary Examiner* — Ahshik Kim
(74) *Attorney, Agent, or Firm* — Birch, Stewart, Kolasch & Birch, LLP

(57) ABSTRACT

Provided is a modular movable robot that is capable of providing various services and realizing automatic driving. The modular movable robot includes a main body, a driving unit mounted on a lower end of the main body so that the main body is movable, a module coupling plate mounted on an upper end of the main body to detect a module coupled to a top surface thereof, a body display unit extending from one end of the module coupling plate in a vertical direction, a head display unit rotatably mounted on an upper end of the body display unit, and a control unit configured to receive information with respect to the detected module from the module coupling plate to control at least one of the body display unit or the head display unit on the basis of the received information.

18 Claims, 10 Drawing Sheets

(51) Int. Cl.
*B25J 5/00* (2006.01)
*B25J 9/08* (2006.01)
*G05D 1/02* (2020.01)
*G06F 21/35* (2013.01)
*G06K 7/10* (2006.01)
*G06K 7/14* (2006.01)
*G06F 3/041* (2006.01)

(52) U.S. Cl.
CPC ......... *G06F 21/35* (2013.01); *G06K 7/10366* (2013.01); *G06K 7/1413* (2013.01); *G06K 7/1417* (2013.01); *G06F 3/041* (2013.01)

(58) Field of Classification Search
USPC ........................................................ 180/204
See application file for complete search history.

(56) References Cited

U.S. PATENT DOCUMENTS

| | | | |
|---|---|---|---|
| 2007/0199108 A1* | 8/2007 | Angle | G16H 70/40 901/17 |
| 2015/0012163 A1 | 1/2015 | Crawley | |
| 2015/0190927 A1* | 7/2015 | Sutherland | B25J 9/1689 901/1 |
| 2016/0114488 A1* | 4/2016 | Mascorro Medina | B25J 11/008 901/1 |
| 2017/0057081 A1 | 3/2017 | Krohne et al. | |
| 2017/0129099 A1 | 5/2017 | Alduaiji et al. | |
| 2017/0225321 A1* | 8/2017 | Deyle | G06K 7/10297 |
| 2017/0312916 A1 | 11/2017 | Williams et al. | |
| 2018/0201444 A1* | 7/2018 | Welty | B25J 5/007 |
| 2020/0242544 A1* | 7/2020 | Galluzzo | B25J 11/00 |

FOREIGN PATENT DOCUMENTS

| | | |
|---|---|---|
| KR | 10-2011-0022130 A | 3/2011 |
| WO | WO 2007/041295 A2 | 4/2007 |
| WO | WO 2017/219681 A1 | 12/2017 |

\* cited by examiner

[Fig. 1]
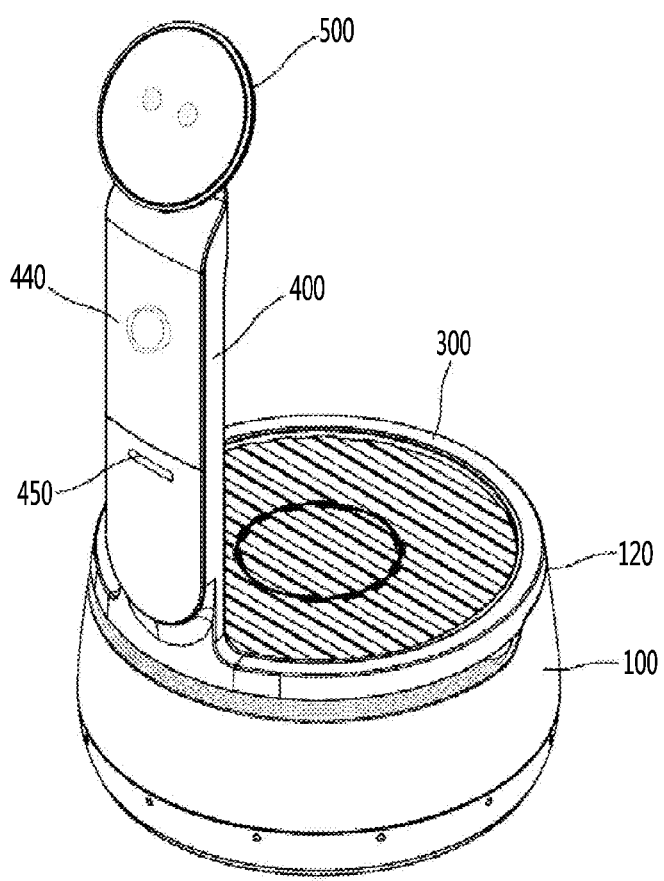

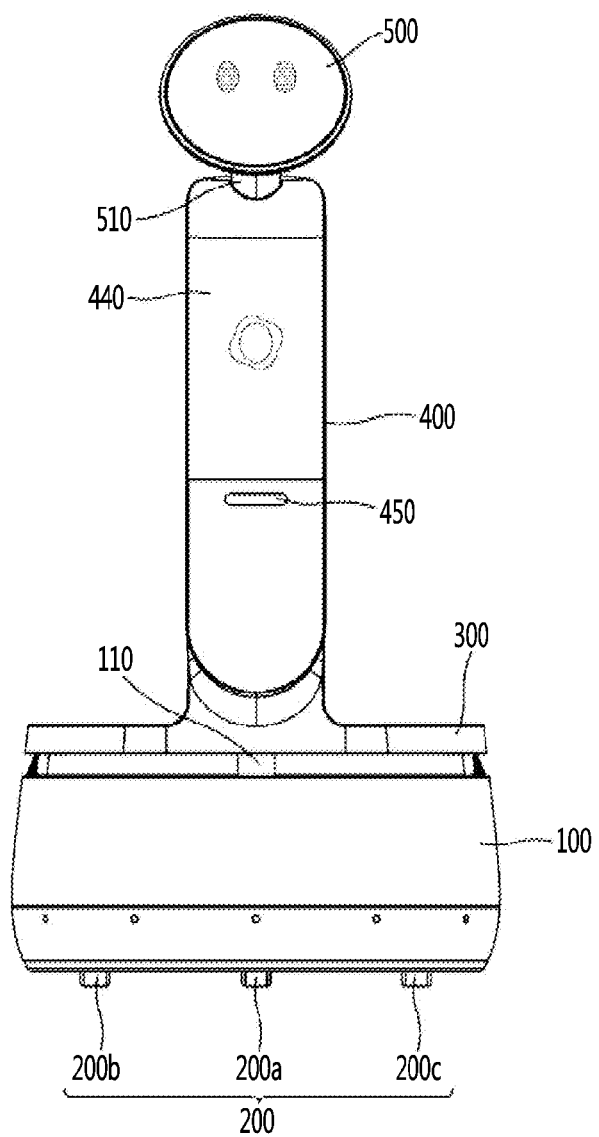
[Fig. 2]

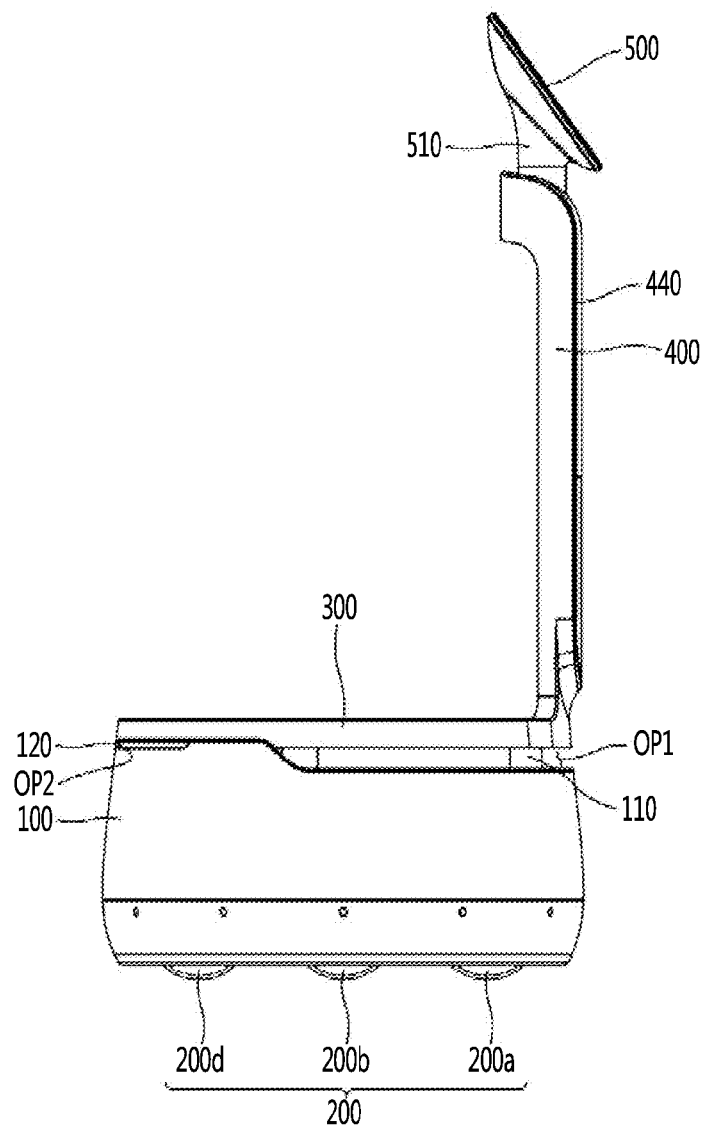
[Fig. 3]

[Fig. 4]
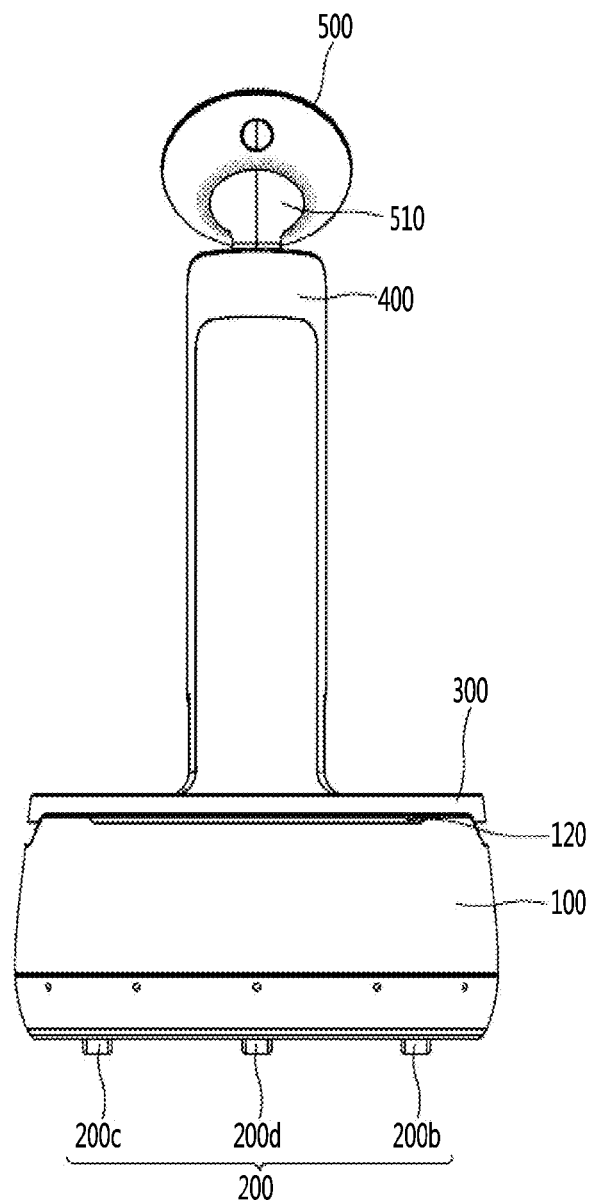

[Fig. 5]
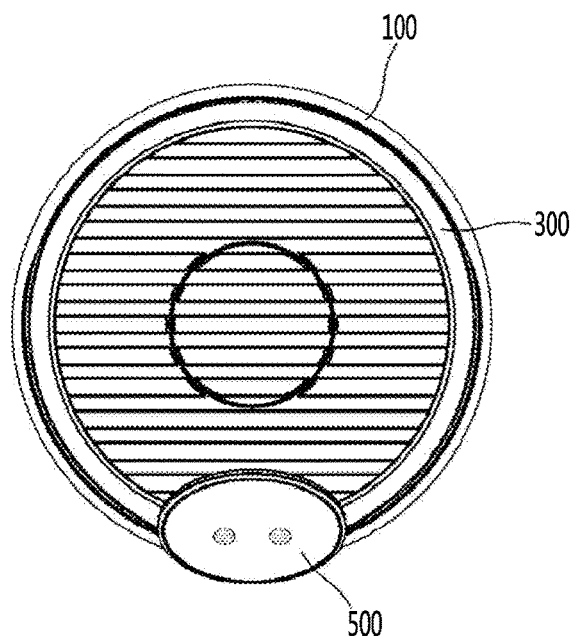

[Fig. 6]
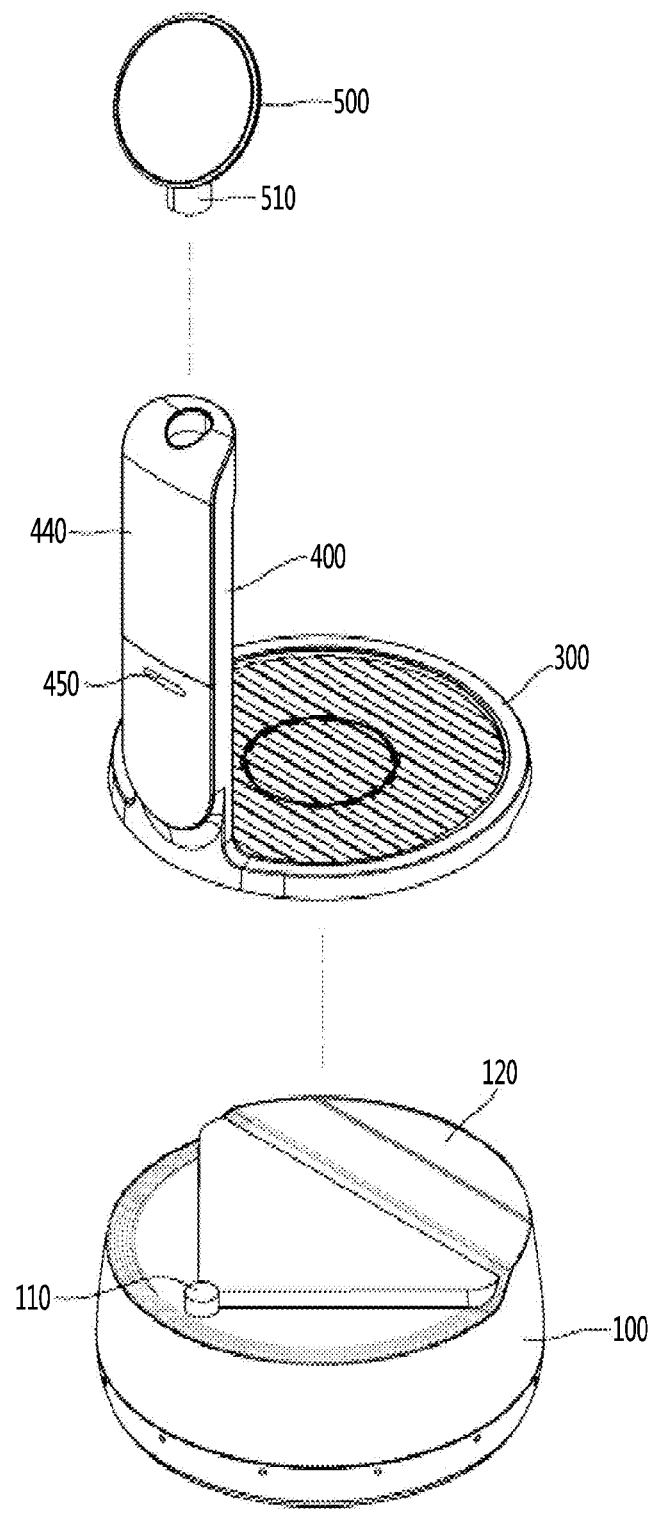

[Fig. 7]
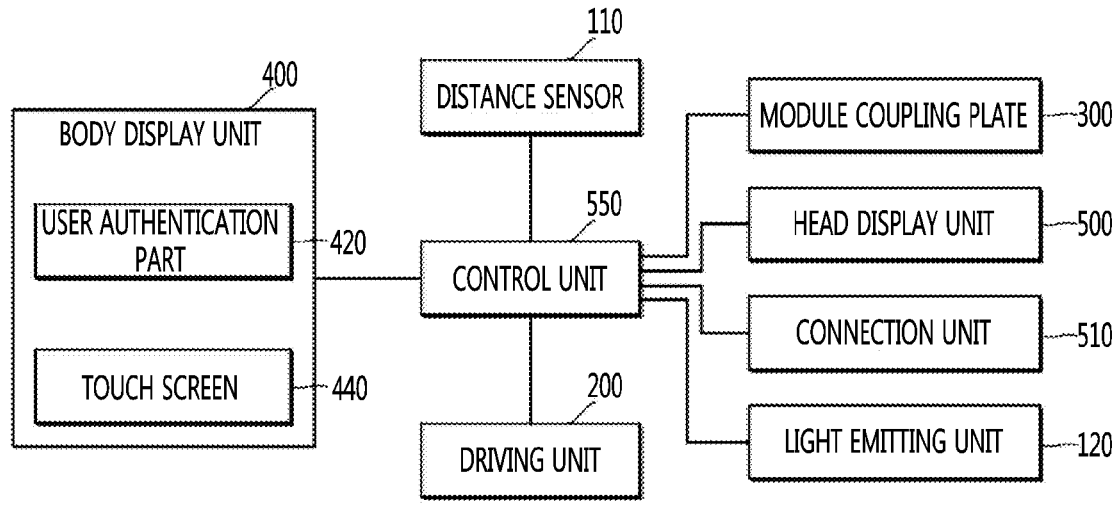
[Fig. 8]
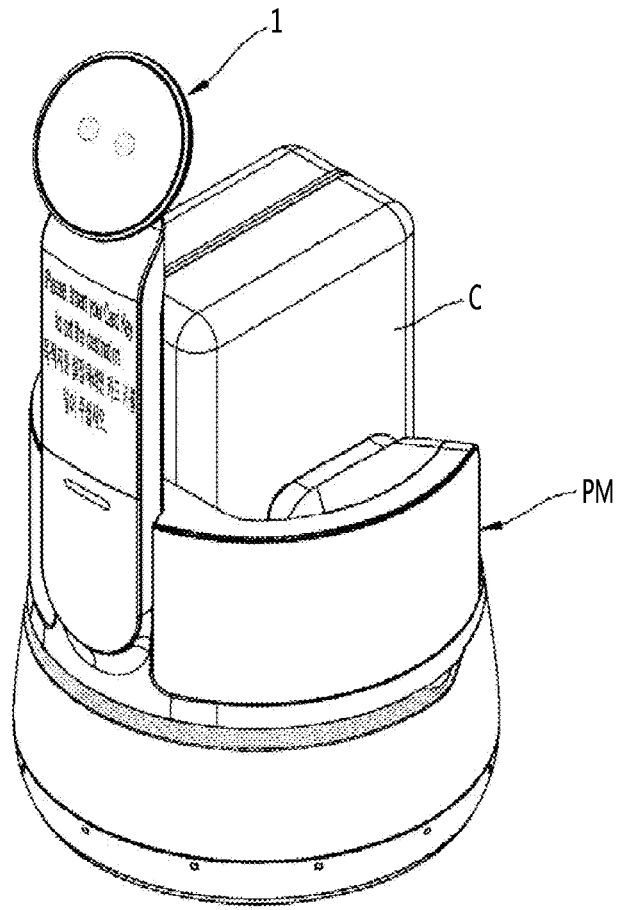

[Fig. 9]
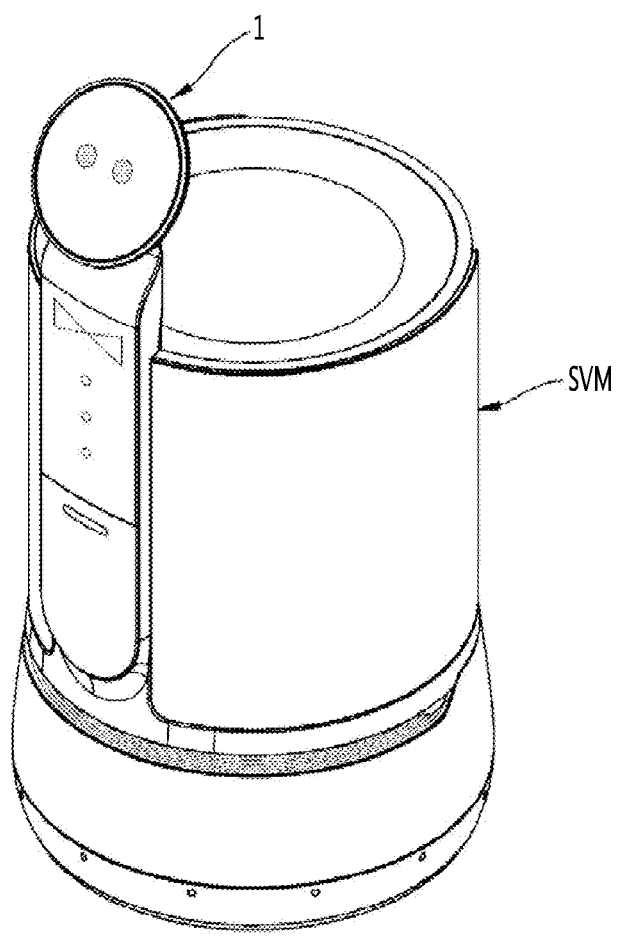

[Fig. 10]
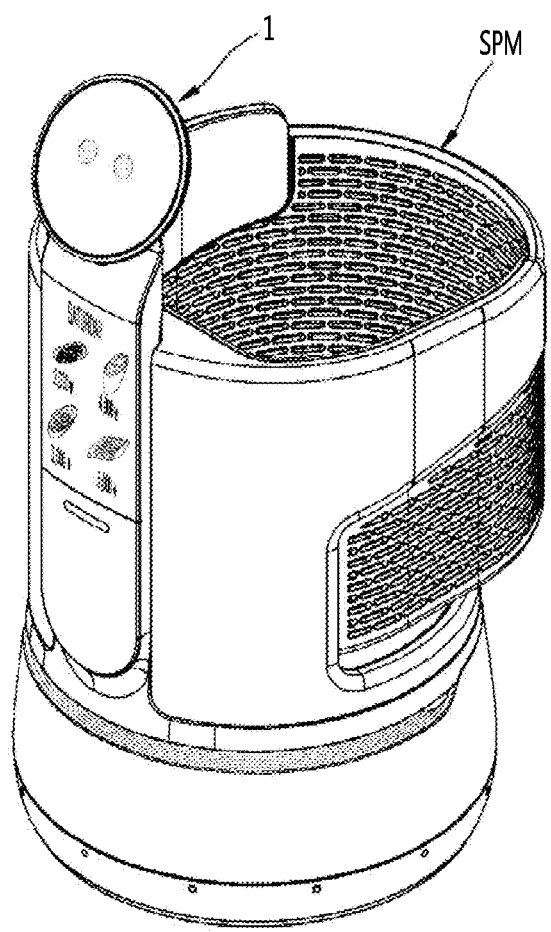

[Fig. 11]
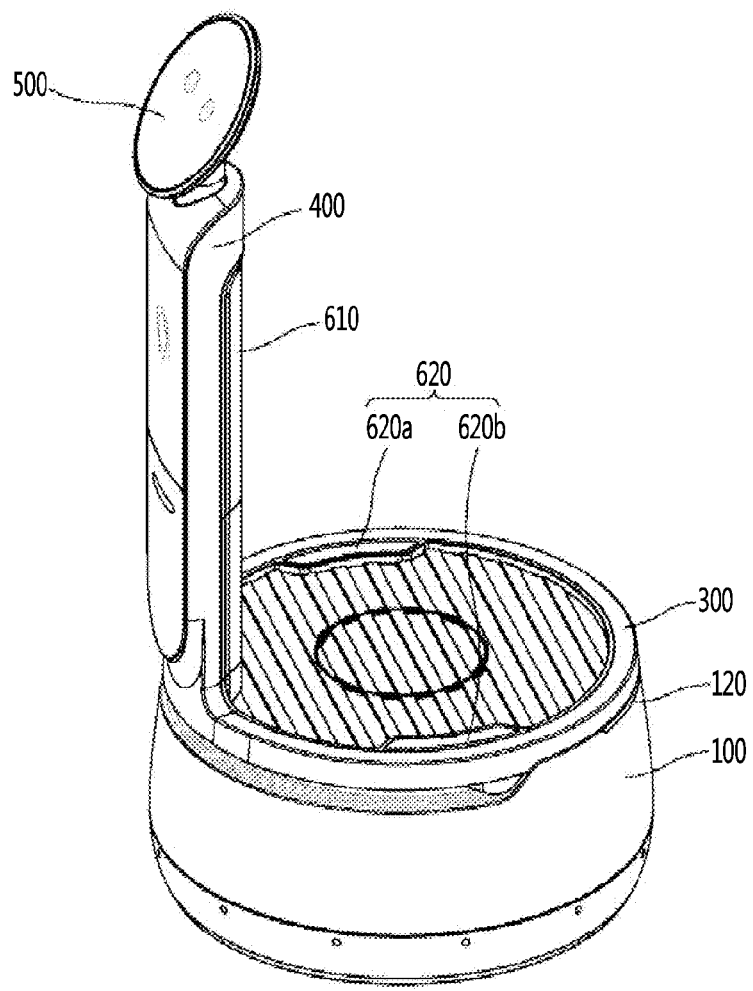

MODULAR MOVABLE ROBOT

CROSS REFERENCE TO RELATED APPLICATIONS

This application is the National Phase of PCT International Application No. PCT/KR2019/005984, filed on May 20, 2019, which claims priority under 35 U.S.C. 119(a) to Patent Application No. 10-2018-0068252, filed in the Republic of Korea on Jun. 14, 2018, all of which are hereby expressly incorporated by reference into the present application.

TECHNICAL FIELD

The present disclosure relates to a modular movable robot that is capable of providing various services and realizing automatic driving.

BACKGROUND ART

Robots have been developed for industrial use in order to be part of factory automation. In recent years, fields of application of the robots have been expanded, and thus, robots that are used in everyday life as well as medical robots and aerospace robots are being developed.

Such a robot for the daily life provides specific services (e.g., shopping, serving, talking, cleaning, etc.) in response to a user's command.

However, since the existing robots for the daily life are designed to provide only a specific service, there is a limitation that cost-effective utilization of the robots is not high.

As a result, in recent years, there is a need for robots capable of providing various services.

DISCLOSURE OF INVENTION

Technical Problem

Embodiments provide a modular movable robot that is capable of providing various services.

Embodiments also provide a modular movable robot to realize automatic driving.

The objects of the present invention are not limited to the aforesaid, but other objects not described herein will be clearly understood by those skilled in the art from descriptions below. Also, the objects and advantages of the present invention the means as claimed and combinations thereof can be easily realized by it will be seen.

Solution to Problem

In one embodiment, a modular movable robot may include a module coupling plate detecting a module coupled to a top surface thereof and a control unit controlling at least one of the body display unit or the head display unit on the basis of information with respect to the detected module, which is received from the module coupling plate to provide various services.

In another embodiment, a modular movable robot includes a distance sensor mounted between a module coupling plate and a main body to detect an obstacle disposed outside the main body, a driving sensor mounted on a lower end of the main body so that the main body is movable, and a control unit controlling driving of the driving unit on the basis of information with respect to a detected obstacle, which is received from the distance sensor to realize automatic driving.

Advantageous Effects of Invention

The modular movable robot according to the embodiment may provide the various services according to the module to be combined and thus may improve the utilization of the existing robot for the daily life. Also, the modular movable robot according to the embodiment may provide the various services by only changing the modules to be coupled to reduce the number of robots required for enjoying the various services. Therefore, the production cost may be reduced, the space utilization may be improved.

In addition, the modular movable robot according to an embodiment may be automatically driven to expand the application fields and improve the service quality. Also, it may be unnecessary to directly move the robot so as to provide the service at a specific position or place, thereby improving the usability.

The specific effects of the present invention in addition to the above-described effects will be described below together while describing specific details for carrying out the invention.

BRIEF DESCRIPTION OF DRAWINGS

FIG. 1 is a perspective view for explaining a modular movable robot according to an embodiment.

FIG. 2 is a front view of the modular movable robot of FIG. 1.

FIG. 3 is a side view of the modular movable robot of FIG. 1.

FIG. 4 is a rear view of the modular movable robot of FIG. 1.

FIG. 5 is a plan view of the modular movable robot of FIG. 1.

FIG. 6 is an exploded perspective view of the modular movable robot of FIG. 1.

FIG. 7 is a schematic view for explaining a control flow of the modular movable robot of FIG. 1.

FIG. 8 is a perspective view for explaining a state in which a porter module is coupled to the modular movable robot of FIG. 1.

FIG. 9 is a perspective view for explaining a state in which a serving module is coupled to the modular movable robot of FIG. 1.

FIG. 10 is a perspective view for explaining a state in which a shopping module is coupled to the modular movable robot of FIG. 1.

FIG. 11 is a perspective view for explaining a modular movable robot according to another embodiment.

MODE FOR THE INVENTION

Preferred embodiments of the inventive concept will be described below in more detail with reference to the accompanying drawings. In the drawings, the same reference numerals are used to denote the same or similar elements.

Hereinafter, a modular movable robot according to an embodiment will be described with reference to FIGS. 1 to 7.

FIG. 1 is a perspective view for explaining a modular movable robot according to an embodiment. FIG. 2 is a front view of the modular movable robot of FIG. 1. FIG. 3 is a side view of the modular movable robot of FIG. 1. FIG. 4 is a rear view of the modular movable robot of FIG. 1. FIG. 5 is a plan view of the modular movable robot of FIG. 1. FIG. 6 is an exploded perspective view of the modular movable robot of FIG. 1. FIG. 7 is a schematic view for explaining a control flow of the modular movable robot of FIG. 1.

For reference, for convenience of description, an example of image information is displayed on each of a body display unit 400 and a head display unit 500 of FIGS. 1, 2, and 5.

Referring to FIGS. 1 to 7, a modular movable robot 1 according to an embodiment may include a main body 100, a distance sensor 110, a light emitting unit 120, a driving unit 200, a module coupling plate 300, a body display unit 400, a head display unit 500, a connection unit 510, and a control unit 550.

The main body 100 may constitute a body of the modular movable robot 1.

In detail, the main body 100 may have, for example, a circular or oval cross-section. Also, the driving unit 200 may be mounted on a lower end of the main body 100, and the module coupling plate 300 may be mounted on an upper end of the main body 100.

Also, the control unit 550 may be provided in the main body 100. Alternatively, the control unit 550 may not be provided in the main body 100 but be provided in the body display unit 400 or the module coupling plate 300. However, for convenience of description, according to an embodiment, the structure in which the control unit 550 is provided (built) in the main body 100 will be described as an example.

Also, the distance sensor 110 and/or the light emitting unit 120 may be mounted on a top surface of the main body 100.

In detail, the distance sensor 110 and the light emitting unit 120 may be mounted between the main body 100 and the module coupling plate 300. Also, the distance sensor 110 may be mounted on a front side of a region between the main body 100 and the module coupling plate 300, and the light emitting unit 120 may be mounted on a rear side of the region between the main body 100 and the module coupling plate 300.

Here, the distance sensor 110 may be, for example, a RGB-D sensor. Also, the distance sensor 110 may grasp a shape of an object to distinguish the object and a surface of floor from each other. Thus, the distance sensor 110 may detect an obstacle disposed outside the main body 100. Furthermore, the distance sensor 110 may provide information with respect to the detected obstacle to the control unit 550.

Also, the light emitting unit may be, for example, a light emitting diode (LED). Also, the light emitting unit may be controlled by the control unit 550 and serve as a rear alarm lamp of the modular movable robot 1.

That is, the control unit 550 may receive the information with respect to the obstacle detected by the distance sensor 110 to control at least one of the driving unit 200 or the light emitting unit 120 on the basis of the received information.

For example, when information in which an obstacle exists at the front of the modular movable robot 1 is received from the distance sensor 110, the control unit 550 may control each of the driving unit 200 and the light emitting unit 120 so that the driving unit 200 is not driven forward, and also, the light emitting unit 120 emits light (that is, the light emitting unit 120 is turned on).

Also, when information in which an obstacle does not exist at the front of the modular movable robot 1 is received from the distance sensor 110, the control unit 550 may control each of the driving unit 200 and the light emitting unit 120 so that the driving unit 200 is driven forward, and also, turn-off of the light emitting unit 120 is maintained.

The driving unit 200 may be mounted on a lower end of the main body 100 to allow the main body 100 to be movable.

In detail, the driving unit 200 may include a plurality of driving wheels 200a, 200b, 200c, and 200d and a plurality of driving motors (not shown) that respectively independently drive the plurality of driving wheels 200a, 200b, 200c, and 200d.

Thus, each of the driving wheels 200a, 200b, 200c, and 200d may be independently driven forward and backward, and thus, the modular movable robot 1 may be easily changed in direction.

For reference, although four driving wheels are provided in the drawings, the present disclosure is not limited thereto. That is, four or more, or four or less of driving wheels may be provided.

Also, the driving unit 200 may be controlled by the control unit 550.

In detail, the driving motor of the driving unit 200 may be controlled by the control unit 550. That is, since the driving motor is driven by the driving unit 200, the driving wheels 200a, 200b, 200c, and 200d connected to the driving motor may also be driven.

The module coupling plate 300 may be mounted on the upper end of the main body 100 to detect the modules coupled to the top surface.

In detail, the module coupling plate 300 may be mounted on the upper end of the main body 100, and the module coupling plate 300 may have, for example, a circular or oval cross-section, like the main body 100.

Also, the body display unit 400 may be disposed on one side of the module coupling plate 300 to extend in a longitudinal direction (i.e., a vertical direction). That is, the body display unit 400 may be integrated with a front side of the module coupling plate 300. Alternatively, the body display unit 400 may be disposed on other portions (e.g., a rear side or a lateral side) in addition to the front side of the module coupling plate 300. Also, the body display unit 400 may be provided in a separation type (i.e., separate components) instead of the integration type. However, for convenience of description, according to an embodiment, the structure in which the body display unit 400 is integrated with the front end of the module coupling plate 300 will be described as an example.

When specific modules (for example, a porter module, a serving module, and a shopping module, which will be described below) are coupled to the top surface of the module coupling plate 300, the module coupling plate 300 may detect a kind of coupled specific module.

In detail, when the specific module is coupled (i.e., electrically connected) to the top surface of the module coupling plate 300, the module coupling plate 300 may receive information (for example, identification (ID) of the porter module) with respect to the corresponding module from the specific module (for example, the porter module). Also, the module coupling plate 300 may detect a kind of module coupled to the top surface on the basis of the information with respect to the corresponding module, which is received from the specific module. Alternatively, the module coupling plate 300 may provide the information with respect to the detected module to the control unit 550, and then the control unit 550 may determine a kind of the module coupled to the module coupling plate 300.

For reference, the module may be coupled to the top surface of the module coupling plate 300 to cover both side surfaces of the body display unit 400. Also, the module may be detachably coupled to the top surface of the module coupling plate 300.

Also, although not shown in the drawings, according to an embodiment, the module coupling plate 300 may include a detection sensor (not shown) that is capable of detecting the module coupled to the top surface.

Here, the detection sensor may detect a weight of the module coupled to the top surface of the module coupling plate 300 to determine the kind of corresponding module.

In detail, the detection sensor may detect a weight of the module coupled to the top surface of the module coupling plate 300 to compare the detected weight of the module to weight information for each module, which is stored in internal database (for example, database provided in the module coupling plate 300 or the main body 100). Thereafter, the detection sensor may select the module having the weight information that matches the detected weight of the module to provide information with respect to the selected module to the control unit 550.

Also, the detection sensor may be linked with the body display unit 400 to detect a height (i.e., a vertical height) of the module coupled to the top surface of the module coupling plate 300, thereby determining a kind of corresponding module.

However, for convenience of description, according to an embodiment, a structure in which the module coupling plate 300 is electrically connected to the module coupled to the top surface without a separate detection sensor to detect the kind of corresponding module will be described as an example.

A first opening OP1 opened in front and both side directions and a second opening OP2 opened in a rear direction may be defined between the module coupling plate 300 and the main body 100.

Thus, the distance sensor 110 mounted on the front area of the area between the main body 100 and the module coupling plate 300 may detect an obstacle through the first opening OP1, and the light emitting unit 120 mounted on the rear area of the area between the main body 100 and the module coupling plate 300 may emit light through the second opening OP2.

The body display unit 400 may be disposed to vertically extend from one end of the module coupling plate 300.

In detail, the body display unit 400 may be integrated with the module coupling plate 300, and the head display unit 500 may be rotatably mounted on an upper end of the body display unit 400. Also, specific information (for example, service information with respect to the coupled module) may be displayed on the body display unit 400.

Also, a user authentication part 420 may be disposed on the body display unit 400.

In detail, the user authentication part 420 may be a module for confirming identification of a user that wishes a specific service from the modular movable robot 1 and provided in the body display unit 400.

Also, the user authentication part 420 may provide information with respect to the authenticated user to the control unit 550. The control unit 550 may control information displayed on the body display unit 400 on the basis of the information with respect to the authenticated user, which is provided from the user authentication part 420. That is, the control unit 550 may display the customized information on the body display unit 400 on the basis of the information with respect to the authenticated user. Alternatively, the control unit 550 may control the driving of the driving unit 200 on the basis of the information with respect to the authenticated user.

For example, at least one of a barcode, a quick response code (QR code), radio frequency identification (RFID), or Bluetooth may be applied to the user authentication part 420.

For reference, a card insertion port 450 may be defined in a front surface of the body display unit 400, and the user authentication part 420 may perform a user authentication operation through a card inserted into the card insertion port 450.

For example, when the porter module is coupled to the modular movable robot 1 used in a hotel, and the user inserts a room card into the card insertion port 450 in a state in which luggage is placed on the modular movable robot 1, the user authentication part 420 may identify (i.e., user authentication) of the user (for example, user's passport information, a room number, the number of nights, etc.) through the card inserted in the card insertion port 450. Thereafter, when the user authentication part 420 provides information on the authenticated user to the control unit 550, the control unit 550 may control the body display unit 400 to display the user's room number, the remaining number of nights, a user name, and the like on the body display unit 400 on the basis of the information about the authenticated user. Furthermore, the control unit 550 may control the driving unit 200 on the basis of the information with respect to the authenticated user to carry a user's luggage to the user's room.

A touch screen 440 may be disposed on the body display unit 400.

In detail, the touch screen 440 may be a device for receiving an input from the user and display specific information (e.g., service information related to the coupled module).

Also, the touch screen 440 may provide the input received from the user to the control unit 550. The control unit 550 may control at least one of the driving unit 200, the body display unit 400, the head display unit 500, or the connection unit 510 that will be described later on the basis of the input received from the touch screen 440.

For example, when a porter module is coupled to the modular movable robot 1 used at an airport, and the user touches a 'Move to Gate 2' icon displayed on the touch screen 440 in a state where the luggage is placed on the modular movable robot 1, the touch screen 440 may provide the input received from the user (i.e., the input with respect to 'Move to Gate 2') to the control unit 550. Also, the control unit 550 may control each of the head display unit 500 and the body display unit 400 so that 'winking expression' is displayed on the head display unit 500, and 'move from the current position to Gate 2' is displayed on the body display unit 400 on the basis of the input received from the touch screen 440. Also, the control unit 550 may control the driving unit 200 on the basis of the input received from the touch screen 440 to carry the user's luggage to Gate 2.

The head display unit 500 may be rotatably mounted on an upper end of the body display unit 400.

In detail, the head display unit 500 may be mounted on the upper end of the body display unit 400 through the connection unit 510. The head display unit 500 may have, for example, a circular cross-section.

Here, the connection unit 510 may connect the head display unit 500 to the body display unit 400. In more detail, the connection unit 510 may have one end fixed and coupled to the head display unit 500 and the other end rotatably coupled to the body display unit 400. For reference, the connection unit 510 may have one end coupled to a rear surface of the head display unit 500 to pass through the head display unit 500 and the other end coupled to a top surface of the body display unit 400 to pass through the body display unit 400.

For reference, the connection unit 510 may be a portion of the head display unit 500 or be a separate component.

However, for convenience of description, according to an embodiment, the structure in which the connection unit 510 is the component that is separated from the head display unit 500 will be described as an example.

Also, specific information (e.g., service information related to the coupled module or facial expression information (e.g., smiley, winking) depending on the situation) may be displayed on the head display unit 500.

Particularly, the expression information may be disposed on the head display unit 500, and thus, the head display unit 500 may serve as a face of the modular movable robot 1. For reference, in the modular movable robot 1, the head display unit 500 may serve as the face, the connection unit 510 may serve as a neck, the body display unit 400 may serve as a body, and the driving unit 200 may serve as a foot.

The control unit 550 may be built in the main body 100 to control the body display unit 400, the head display unit 500, the driving unit 200, the light emitting unit 120, and the connection unit 510.

That is, the control unit 550 may control information displayed on each of the body display unit 400 and the head display unit 500, rotation of the head display unit 500 (i.e., rotation of the connection unit 510), and an operation of each of the driving unit 200 and the light emitting unit 120.

In detail, as illustrated in FIG. 7, the control unit may receive information with respect to the module detected by the module coupling plate 300 to control at least one of the body display unit 400 or the head display unit 500 on the basis of the received information. That is, the control unit 550 may control the body display unit 400 and/or the head display unit 500 so that specific information (for example, service-related UI (user interface) dependent on the detected module) is displayed on the body display unit 400 (i.e., the touch screen 440) and/or the head display unit 500. In other words, the control unit 550 may change user interfaces provided by the body display unit 400 and/or the head display unit 500 based on the information with respect to the detected module.

Further, the control unit 550 may control moving behavior of the robot based on the information with respect to the detected module. For instance, the moving speed of the robot when the detected module is a porter module may be higher than the moving speed of the robot when the detected module is a serving module.

Further, the control unit 550 may use different data, which are stored in a memory space of the robot or received from a server associated with the robot, based on the information with respect to the detected module. For instance, when the detected module is a porter module, the control unit 550 may retrieve and use map data of a hotel, where the robot is located, from a memory space. When the detected module is a serving module, the control unit 550 may retrieve and use map data of a restaurant, which the robot is located, from the memory space.

Also, the control unit 550 may receive information with respect to an obstacle detected by the distance sensor 110 to control at least one of the driving unit 200 or the light emitting unit 120 on the basis of the received information. That is, the control unit 550 may control a driving direction or driving of the driving unit 200 according to the detected obstacle and also control driving of the light emitting unit 120.

Also, the control unit 550 may control at least one of the information displayed on the body display unit 400 (i.e., the touch screen 400) or the driving of the driving unit 200 on the basis of the information with respect to the authenticated user, which is received from the user authentication part 420.

Also, the control unit 550 may control at least one of the driving unit 200, the body display unit 400, or the head display unit 500 on the basis of the input (i.e., the user input) received from the touch screen 440.

Also, the control unit 550 may control rotation of the head display unit 500 on the basis of the information received from the module coupling plate 300, the distance sensor 110, the user authentication part 420, or the touch screen 440. Alternatively, the control unit 550 may control rotation of the connection unit 510 to indirectly control the rotation of the head display unit 550.

As described above, the modular movable robot 1 according to an embodiment has the same constituent and characteristic as those of the modular movable robot 1 according to the foregoing embodiment. Thus, hereinafter, various application examples of the modular movable robot 1 will be described with reference to FIGS. 8 to 10.

FIG. 8 is a perspective view for explaining a state in which a porter module is coupled to the modular movable robot of FIG. 1. FIG. 9 is a perspective view for explaining a state in which a serving module is coupled to the modular movable robot of FIG. 1. FIG. 10 is a perspective view for explaining a state in which a shopping module is coupled to the modular movable robot of FIG. 1.

For reference, for convenience of description, an example of image information is displayed on each of the body display unit 400 and a head display unit 500 of FIGS. 8 to 10.

First, referring to FIG. 8, a porter module PM is coupled to a modular movable robot 1.

In detail, the porter module PM is a module for carrying a user's load C (for example, a luggage) at a hotel, a resort, an airport, and the like.

Thus, when the porter module PM is coupled to the modular movable robot 1, the modular movable robot 1 may be a robot providing a carrying service.

For example, the modular movable robot 1 to which the porter module PM is coupled may carry a customer's load C at a place such as a hotel or a resort and guide the customer to the room. In addition, the modular movable robot 1 to which the porter module PM is coupled may provide check-in or check-out service to the customer.

Sequentially, referring to FIG. 9, a serving module SVM is coupled to the modular movable robot 1.

In detail, the serving module SVM is a module for providing a service to a user at a hotel, a restaurant, and the like.

Thus, when the serving module SVM is coupled to the modular movable robot 1, the modular movable robot 1 may be a robot providing the serving.

For example, the modular movable robot 1 to which the serving module SVM is coupled may provide a room service to a customer at a place such as a hotel or a resort and guide the customer to the room. In addition, the modular movable robot 1 to which the serving module SVM is coupled may also serve (e.g., serve water, provide a menu plate, etc.) to a customer at a place such as a restaurant or a banquet hall.

Finally, referring to FIG. 10, a shopping module SPM is coupled to the modular movable robot 1.

In detail, the shopping module SPM is a module for providing a shopping service to a user in a mart, a department store, an outlet, and the like.

Thus, when the shopping module SPM is coupled to the modular movable robot 1, the modular movable robot 1 may be a robot providing the shopping service.

For example, a modular movable robot 1 to which the shopping module SPM is coupled may carry goods or food purchased by the customer in a place such as a mart, a department store, or an outlet and may provide a guidance and an unattended service to the customer. In addition, the modular movable robot 1 to which the shopping module SPM is coupled may provide an optimal shopping course and discount information to the customer.

As described above, the modular movable robot 1 according to an embodiment may provide the various services according to the module to be coupled and thus may improve the utilization of the existing robot for the daily life. Also, the modular movable robot 1 according to an embodiment may provide the various services by only changing the modules to be combined to reduce the number of robots required for enjoying the various services. Therefore, the production cost may be reduced, the space utilization may be improved.

In addition, the modular movable robot 1 according to an embodiment may be automatically driven to expand the application fields and improve the service quality. Also, it may be unnecessary to directly move the robot so as to provide the service at a specific position or place, thereby improving usability.

Hereinafter, a modular movable robot according to another embodiment will be described with reference to FIG. 11.

FIG. 11 is a perspective view for explaining a modular movable robot according to another embodiment.

For reference, a modular movable robot 2 according to another embodiment of the present invention is the same as the modular movable robot 1 of FIG. 1 except for some components, and thus, a difference therebetween will be mainly described.

Referring to FIG. 11, unlike the modular movable robot 1 of FIG. 1, the modular movable robot 2 according to another embodiment of the present invention further includes a first coupling fixing part 610 and a second coupling fixing part 620.

In detail, the first coupling fixing part 610 may be disposed on a rear surface of a body display unit 400 to horizontally extend. Also, the second coupling fixing part 620 may protrude upward from an edge of a top surface of a module coupling plate 300. Also, the second coupling fixing part 620 may be provided in plurality 620a and 620b (alternatively, two second coupling fixing parts may be provided).

Also, as described above, the module may be coupled to a top surface of a module coupling plate 300 to cover both side surfaces of a body display unit 400.

Thus, when the specific module is coupled to the modular mobile robot 2, the first coupling fixing part 610 contacts a front surface of the corresponding module, and the second coupling fixing part 620 contacts a bottom surface of the corresponding module. That is, the first coupling fixing part 610 supports the front surface of the corresponding module, and the second coupling fixing part 620 supports the bottom surface of the corresponding module.

Also, due to the support structure (i.e., the first and second coupling fixing parts 610 and 620), the corresponding module may be firmly fixed to the body display unit 400 and the module coupling plate 300. That is, the corresponding module may be fixed to the body display unit 400 by the first coupling fixing part 610 and fixed to the module coupling plate 300 by the second coupling fixing part 620.

For reference, a longitudinal length of the first coupling fixing part 610 may be changed according to a vertical height of the coupled module. Thus, a contact area between the first coupling fixing part 610 and the corresponding module may be changed. In addition, although not shown, the above-described detection sensor may be disposed on the second coupling fixing part 620.

While the present invention has been described with respect to certain preferred embodiments, it will be apparent to those skilled in the art that various changes and modifications may be made without departing from the scope of the invention as defined in the following claims.

| Sequence Listing Free Text | |
|---|---|
| 100: | Main body |
| 110: | Distance sensor |
| 120: | Light emitting unit |
| 200: | Driving unit |
| 300: | Module coupling plate |
| 400: | Body display unit |
| 500: | Head display unit |
| 510: | connection unit |
| 550: | Control unit |

The invention claimed is:

1. A robot, comprising:
a main body having an upper portion and a lower portion;
a driver provided at the lower portion of the main body, the driver being configured to provide movement of the main body;
a body display extending upward from one side of the upper portion of the main body, the body display including an inclined portion at an upper end thereof;
a module detachably disposed above the upper portion, the module being configured to receive food or goods therein;
a module coupling plate provided at the upper portion of the main body, the module coupling plate being configured to detect the module coupled to the module coupling plate;
a head display provided on the body display; and
a controller configured to:
receive module information with respect to the detected module from the module coupling plate; and
control at least one of the body display or the head display based on the received module information.

2. The robot according to claim 1, wherein the head display is rotatably supported on the inclined portion of the body display.

3. The robot according to claim 2, wherein the head display is rotatable left-to-right between a first position where the head display and the body display face a same direction, and a second position where the head display and the body display face in opposite directions.

4. The robot according to claim 1, further comprising a connector configured to connect the head display to the body display,
wherein the connector has a first end coupled to a rear side of the head display, and
wherein the connector has a second end coupled to the inclined portion of the body display.

5. The robot according to claim 1, further comprising a user authenticator provided in the body display, the user authenticator being configured to receive user information with respect to a user,
wherein the controller is further configured to:
receive the user information from the user authenticator; and
control at least one of information displayed on the body display or driving of the driver based on the user information received.

6. The robot according to claim 5, wherein the user authenticator is configured to have at least one of a barcode, a quick response code (QR code), radio frequency identification (RFID), or Bluetooth applied to the user authenticator.

7. The robot according to claim 1, wherein the body display comprises a touch screen configured to receive an input from a user,
wherein the touch screen is configured to provide the input received from the user to the controller, and
wherein the controller is further configured to control at least one of the driver, the body display, or the head display based on the input received from the touch screen.

8. The robot according to claim 1, wherein the controller is provided in the main body, and
wherein the controller is further configured to control information displayed on the body display, information displayed on the head display, rotation of the head display, and driving of the driver.

9. The robot according to claim 1, wherein the driver comprises a plurality of driving wheels, and
wherein the controller is further configured to independently control movement of the plurality of driving wheels.

10. The robot according to claim 1, further comprising:
a first coupling fixing member disposed at a rear side of the body display and extending in a horizontal direction; and
a second coupling fixing member disposed at an upper side of the module coupling plate and extending in a vertical direction.

11. The robot according to claim 10, wherein the module is fixed to the body display by the first coupling fixing member, and fixed to the module coupling plate by the second coupling fixing member.

12. The robot according to claim 1, wherein the module is detachably coupled to a top surface of the module coupling plate,
wherein the module is one of a shopping module, a porter module, or a serving module,
wherein the shopping module enables the robot to carry goods purchased by a user,
wherein the porter module enables the robot to carry luggage of a user or guide the user to a room belonging to the user, and
wherein the serving module enables the robot to provide room service or perform serving to a user.

13. The robot according to claim 1, further comprising a first opening in the main body, the first opening extending from a right side of the main body to a left side of the main body.

14. The robot according to claim 13, wherein the first opening extends around the main body by more than 180 degrees.

15. A robot, comprising:
a main body having an upper portion, a lower portion, and a first opening, the first opening extending from a right side of the main body to a left side of the main body;
a driver provided at the lower portion of the main body, the driver being configured to provide movement of the main body;
a body display extending upward from one side of the upper portion of the main body, the body display including an inclined portion at an upper end thereof;
a module detachably disposed above the upper portion, the module being configured to receive food or goods therein;
a head display provided on the body display; and
a sensor located within the main body,
wherein the sensor is configured to detect an obstacle disposed beyond the main body, and
wherein the sensor is configured to detect the obstacle through the first opening.

16. The robot according to claim 15, further comprising:
a second opening in the main body of the robot; and
a light emitter configured to emit light,
wherein the light emitter is configured to emit the light through the second opening.

17. The robot according to claim 16, further comprising a controller configured to:
receive obstacle information with respect to the obstacle detected by the sensor; and
control at least one of the driver or the light emitter based on the received obstacle information.

18. The robot according to claim 15, wherein the sensor is an RGB-D sensor.

* * * * *